Oct. 1, 1968    A. S. ZUCKER    3,404,267
LIGHTS FOR PORTABLE DEVICES
Filed Sept. 27, 1966    2 Sheets-Sheet 2
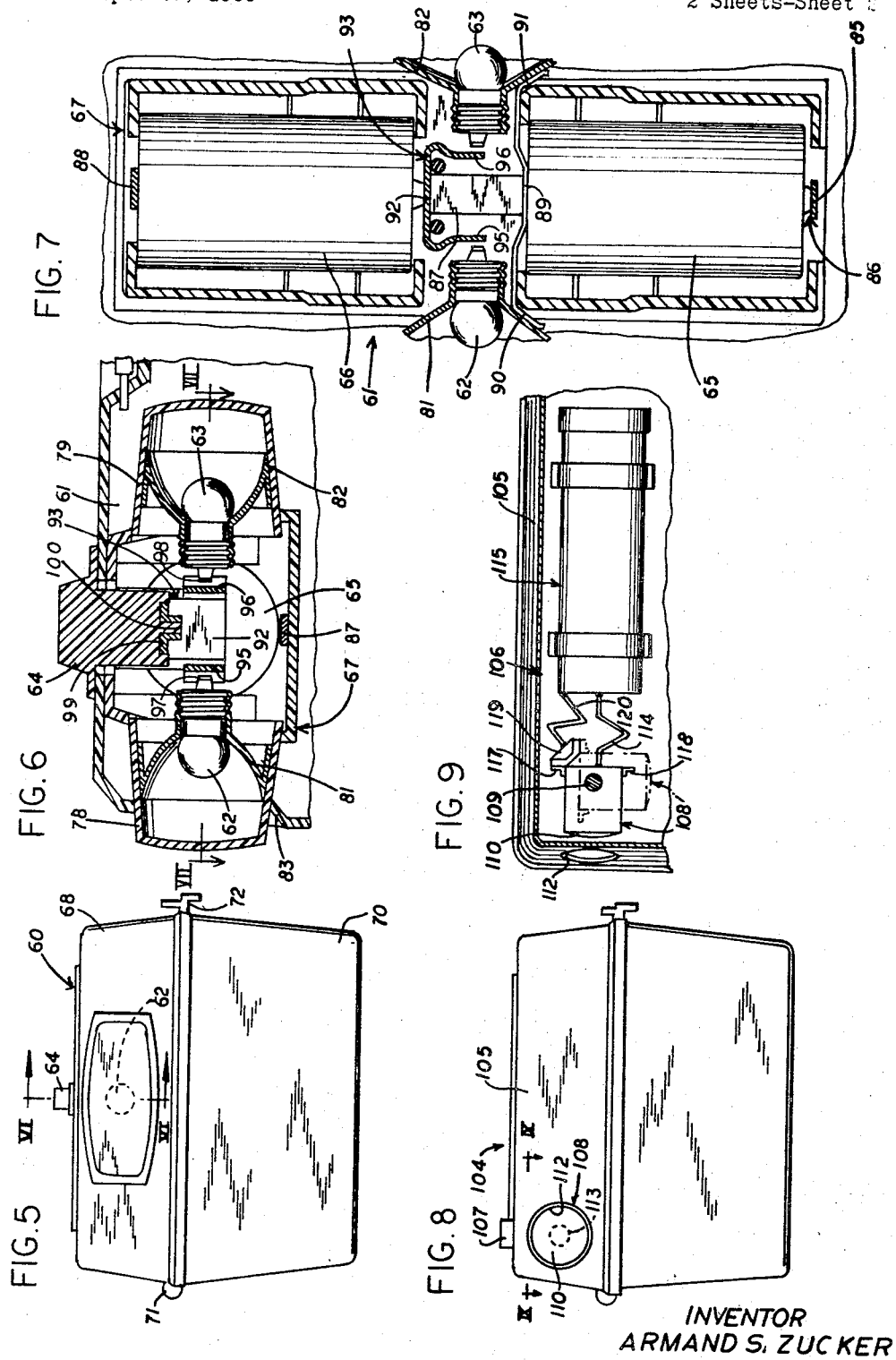
INVENTOR
ARMAND S. ZUCKER
BY Alberts, Brezina & Lund
ATTORNEYS

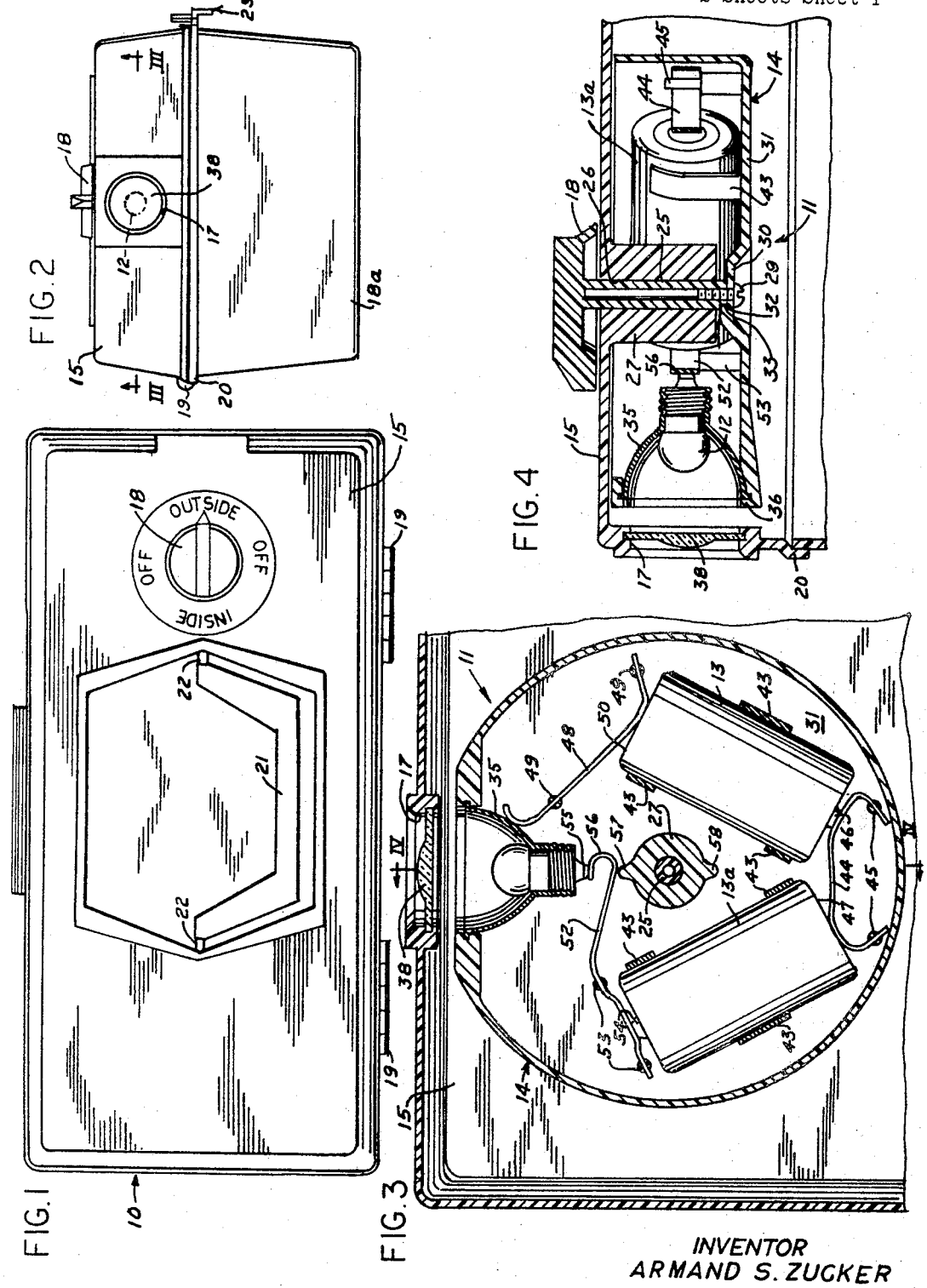

United States Patent Office 3,404,267
Patented Oct. 1, 1968

3,404,267
LIGHTS FOR PORTABLE DEVICES
Armand S. Zucker, Skokie, Ill., assignor to Famous Keystone Corporation, Chicago, Ill., a corporation of Illinois
Filed Sept. 27, 1966, Ser. No. 582,421
1 Claim. (Cl. 240—6.4)

This invention relates to battery powered lights and more particularly to battery powered light arrangements for use in a fishing tackle box, tool box, satchel or other portable device whereby the light arrangements can be used selectively to project light from the device or to illuminate the inner contents of the device. The light arrangements of this invention are highly effective and reliable while being compact, light in weight and readily and economically manufacturable.

It is often desirable when carrying a fishing tackle box, tool box or the like at night to have a light which need not be carried separately from the box for projecting a beam of light outside of the box to illuminate an area outside the box, including the path of the person carrying the box. It is also desirable to have a light which may be used to illuminate the inside of the box so that the contents thereof may be readily seen and used. Lighting arrangements have been constructed whereby a light unit is attached onto or within a box for projecting light outside the box, and a separate light unit is attached within the box for illuminating the contents thereof. Although these arrangements have served fairly well their double purpose, they have been unnecesarily costly to construct and they have occupied an unnecessarily large portion of the carrying box in which they were placed.

The present invention is designed to overcome the disadvantages of these previous systems and to provide light weight, inexpensive and reliable portable light arrangements which can be used with a fishing tackle box, tool box or other portable device to alternatively project a beam of light outside the device for illuminating the path of the person carrying the device, or to direct the beam of light inside the device for illuminating the contents thereof.

An impotrant feature of the present invention relates to the provision of a single light unit attached to a carrying case, which light unit may be selectively controlled to project light outside the device or into the device.

According to a specific feature of the invention, a single switch is provided for controlling the energization of the light unit and the direction of projection of the light projecting therefrom.

According to a second specific feature of the invention, a single lamp is provided and is selectively positioned to project light into the portable device or outward away therefrom.

According to another specific feature of the invention, the lamp is rotatable between two select positions for projecting light into and out of the portable device about an axis of rotation through the light unit.

Another specific feature of the invention relates to the provision of an automatic switching arrangement by which the light unit is automatically activated when it is placed in either of the two select positions and is automatically de-activated when it is placed in any other position.

A further specific feature of the invention relates to the provision of a control device which extends outside the portable device for controlling the activation of the light unit and the direction of projection of light therefrom.

A still further feature of the invention relates to the arrangement of the power supply batteries inside the cylindrical case containing the light unit.

This invention contemplates other and more specific objects, features and advantages which will become more fully apparent from the following detailed description taken in conjunction with the accompanying drawings which illustrate a preferred embodiment and in which:

FIGURE 1 is a top plan view of a fishing tackle box having a light unit constructed according to the principles of this invention;

FIGURE 2 is an end elevational view of the tackle box of FIGURE 1;

FIGURE 3 is a cross sectional view of a portion of the tackle box of FIGURE 2, taken along the lines III—III thereof;

FIGURE 4 is a cross sectional view of the portion of the tackle box of FIGURE 3, taken along the line IV—IV thereof;

FIGURE 5 is an end elevational view of a fishing tackle box having a modified light unit constructed according to the principles of this invention;

FIGURE 6 is a cross sectional view of a portion of the cover of the fishing tackle box of FIGURE 5, taken along the line VI—VI thereof;

FIGURE 7 is a cross sectional view of the portion of the cover of the fishing tackle box of FIGURE 6, taken along the line VII—VII thereof;

FIGURE 8 is an end elevational view of a cover of a fishing tackle box, showing a second modified light unit; and FIGURE 9 is a view of the underside of the box cover of FIGURE 8, showing the second modified light unit thereof.

Reference numeral 10 generally designates a fishing tackle box having a light unit 11 therein constructed according to the principles of this invention. The light unit 11 comprises a lamp or bulb 12 and batteries 13 and 13a situated in a generally cylindrical case 14 in a cover 15 of the tackle box 10. The lamp or bulb 12 of the light unit 11 is positioned, as shown in FIGURES 1-4, to project light out of the box 10 through an opening 17 therein, but the generally cylindrical case 14 containing the bulb 12 may be rotated 180° in order to position the bulb 12 to project light into the box 10 to illuminate the contents thereof. A control knob 18 controls the position of the light unit 11 and also the energization or de-energization thereof, which is automatically controlled by the position of the unit 11.

In particular, the tackle box 10 comprises a body portion 18a to which the cover 15 is attached by means of the hinges 19, cover 15 having a bottom flange 20 which fits over a top rim of the body portion 18a. The tackle box 10 and the cylindrical case 14 are preferably of molded plastic, although they may be constructed of metal or other sturdy material. A handle 21 is attached to the cover 15 by means of metal pins 22, and a flexible clasp 23 securely affixed to the body portion 18a, fastens over the bottom flange 20 to clasp the cover 15 to the body portion 18a. The cylindrical case 14 containing the light unit 11 is rotatably fastened to the underside of the cover 15 by means of the control knob 18 which has a generally cylindrical shaft 25 journaled through an opening 26 in cover 15 and in an integral depending sleeve portion 27 of the cover 15. The shaft 25 is attached at its lower end by means of a screw 29 to a raised portion 30 of a bottom 31 of the cylindrical case 14. A flattened portion 32 of the generally cylindrical lateral edge at the end of the shaft 25 sits securely against an upwardly protruding shoulder 33 to maintain the cylindrical case 14 rotatably fixed to the shaft 25 of the control knob 18.

The lamp or bulb 12 of the light unit 11 is threadedly connected to a metal reflector 35 which has a peripheral edge fitted in an opening in a peripheral wall 36 of the case 14. A plastic lens 38 is fitted in the opening 17 for protecting the bulb 12 and reflector 35 and for providing a waterproof construction. The batteries 13 and 13a are held securely in place in the cylindrical case 14 by means of six guide walls 43 which protrude from the bottom 31 of the case 14. A sheet metal spring 44 is held by two guide poles 45 which protrude from the bottom 31 of the case 14, and the spring 44 connects the positive pole 46 of battery 13 with the negative pole 47 of battery 13a. A second sheet metal spring 48 is held by two guide posts 49 to connect the negative pole 50 of battery 13 with the metal reflector 35, which is in electrical contact with one terminal of the bulb 12. A third sheet metal spring 52 is held by two guide posts 53 in such a way as to contact the positive pole 54 of battery 13a and to selectively contact a second terminal 55 of the bulb 12, to complete the electrical circuitry thereto. The third sheet metal spring 52 has a curved end 56 which is engageable with either of two diametrically opposed cam lobes 57 and 58 on the depending sleeve portion 27 of the cover 15. The lobe 57 contacts the curved end 56 of the spring 52 when the cylindrical case 14 is positioned as shown in FIGURES 1–4 and the lobe 58 contacts the curved end 56 of the spring 52 when the cylindrical case 14 is turned 180 degrees from the position shown in FIGURES 1–4. The lobes 57 and 58 force the curved end 56 away from the axis of shaft 25 and into contact with the terminal 55 of the bulb 12 to complete the electrical circuitry thereto and to energize bulb 12. When the cylindrical case 14 is positioned in any position other than the one shown in FIGURES 1–4 or in a position in 180 degree relation thereto, the curved end 56 moves radially inwardly toward shaft 25 and disengages the terminal 55 of bulb 12 to break the electrical contact thereto and deenergize the bulb 12.

With this arrangement, bulb 12 is automatically turned on when the bulb 12 is positioned to project light directly out of or directly into the box 10, but bulb 12 is automatically turned off when it is positioned in any other position. It should also be noted that the batteries 13 and 13a are positioned in the generally cylindrical case 14 in such a way as to occupy a minimum of space consonant with the automatic switching of the light 11 and with the construction of the light 11 to project light either into or out of the tackle box 10.

A modified construction of the portable light unit of this invention is shown in FIGURES 5–7 wherein a tackle box 60 contains a light unit 61 having two bulbs 62 and 63 controlled by a single slidable switch actuator 64 and powered by the two batteries 65 and 66, located in a plastic case 67 fastened to the underside of a cover 68 of the box 60. The box 60 has its cover 68 hinged and clasped to a body portion 70 by means of the hinges 71 and clasp 72, as in the tackle box 10. The plastic case 67 is suitably attached to the underside of the cover 68. Two plastic lenses 78 and 79 fit over the ends of two metal reflectors 81 and 82 threadedly engaged with the bulbs 62 and 63. Lens 78 protrudes outward through an opening 83 in the cover 68, while lens 79 faces the center of the cover 68.

A positive pole of the battery 65 engages one leg 85 of a generally U-shaped connection member 86 which has a bight portion 87 extending under batteries 65 and 66 and which has an opposite leg 88 engaged with a negative pole of the battery 66. The negative pole of the battery 65 is engaged with a center portion of a sheet metal spring member 89 having opposite ends 90 and 91 engaged with the reflectors 81 and 82 which are connected to terminals of the bulbs 62 and 63.

The positive pole of the battery 66 is engaged with a center portion 92 of a generally U-shaped sheet metal switch member 93 having legs 95 and 96 selectively engageable with end terminals 97 and 98 of bulbs 62 and 63. The switch member 93 has a flange portion 99 which is press-fitted on a depending pin portion 100 at the lower end of the slidable switch actuator 64. When the actuator 64 is moved outwardly, the leg 95 of the switch member 93 engages the terminal 97 to engage the bulb 62 and when it is moved inwardly the leg 96 of the switch member 93 engages the terminal 98 to energize the bulb 63. At an intermediate position, as illustrated, neither bulb is energized. Thus, the switch actuator 64 controls both the energization and deenergization of the light unit 61 and the direction of projection of light therefrom. It should be noted that the batteries 65 and 66 are placed in a position to take up a minimum of desirable space in the cover of the tackle box, and the switching arrangement is designed to provide easy, reliable and inexpensive switching and direction control of the light unit 61.

Another modified construction of the light for portable devices of this invention is shown in outline in FIGURES 8 and 9, wherein another fishing tackle box 104 comprises a cover 105 having a light unit 106 located on the inside thereof to swivelly direct light either out of the cover 105 or into it. A control knob 107 is connected to a movable portion 108 of the light unit 106 by means of a shaft 109 which is fixedly secured to the movable portion 108. A lens 110 of the movable portion 108 of light unit 106 is positionable behind an opening 112 of the cover 105, and a bulb 113 is located behind the lens 110 to project light out of the cover 105 when the movable portion 108 is located in the position shown in FIGURES 8 and 9. An electrical cable 114 connects one terminal of a socket for the bulb 113 with one terminal of battery power supply portion 115. The other terminal of the socket for the bulb 113 is connected to a pair of contacts 117 and 118 on the movable portion 108 which are selectively engageable with a fixed contact member 119, connected through a wire 120 to the opposite terminal of the battery power supply portion 115. The movable portion 108 may be controlled by the control knob 107 to swivel the portion 108 on the shaft 109 to direct light into the cover 105, as shown by the dotted lines of FIGURE 9. With this arrangement, the light unit 106 may be swivelly controlled to direct light either out of or into the cover 105, which is hingedly secured to the portable tackle box 104. At intermediate positions of the portion 108, the bulb 113 is deenergized.

It will be understood that other modifications and variations may be effected in the present invention without departing from the spirit and scope of the novel concepts of this invention.

I claim as my invention:

1. In a portable device, a housing, a battery operated light unit mounted in said housing and arranged to selectively project light either outwardly from said housing or inwardly into said housing, said light unit including a single lamp selectively movable between a first position to project light outwardly from said housing and a second position to project light inwardly into said housing, a control knob connected to said light unit and extending outside said housing to control the position of said light unit, means journalling said light unit for rotation on its axis and having two projections at positions corresponding to said first and second positions of said lamp, and a switch element for energizing and de-energizing said lamp located in said light unit and arranged to contact one of said two projections to be activated when said lamp is in either said first or said second position, whereby said lamp is automatically energized when said lamp is in either said first or said second position.

References Cited

UNITED STATES PATENTS

| 1,926,108 | 9/1933 | Muldoon | 240—10.67 |
| 2,612,598 | 9/1952 | Berman | 240—10.67 |
| 2,712,058 | 6/1955 | Grebey et al. | 240—10.67 |

NORTON ANSHER, *Primary Examiner.*

JOSEPH F. PETERS, JR., *Assistant Examiner.*